Nov. 14, 1939. T. W. ROLPH 2,179,863
LIGHT DIRECTING BRICK AND WALLS AND BUILDINGS UTILIZING THE SAME
Filed Aug. 25, 1933 2 Sheets-Sheet 1

INVENTOR.
THOMAS W. ROLPH
BY
ATTORNEY.

Nov. 14, 1939.                T. W. ROLPH                 2,179,863
LIGHT DIRECTING BRICK AND WALLS AND BUILDINGS UTILIZING THE SAME
                   Filed Aug. 25, 1933          2 Sheets-Sheet 2

INVENTOR.
THOMAS W. ROLPH
BY
ATTORNEY.

UNITED STATES PATENT OFFICE 2,179,863

LIGHT DIRECTING BRICK AND WALLS AND BUILDINGS UTILIZING THE SAME

Thomas W. Rolph, Newark, Ohio, assignor to Holophane Company, Inc., New York, N. Y., a corporation of Delaware Application August 25, 1933, Serial No. 686,741

13 Claims. (Cl. 88—60)

The present invention relates to light directing bricks and walls and buildings utilizing the same.

To provide translucent walls in building construction it has heretofore been proposed to utilize bricks made out of glass or other transparent or translucent material. These are generally made in the form of more or less box-shaped glass articles having five sides, and are used alone or with a closure or cover member to make a six-sided brick. These glass bricks were pressed or molded out of glass, more or less diffusing, depending upon the manner in which the bricks were formed.

Building walls made out of these translucent bricks have the advantage of transmitting light in or out, so as to employ natural light for interior lighting, or to produce a luminous effect for the building wall when the interior is lighted artificially at night. When these translucent walls are used for lighting interiors from outdoor light, the light received comes from the sky and the light transmitted is placed on the floor or in the lower regions of the room. Hence the brightest part of the room is at the floor close to the walls so that the general distribution of the light is frequently unsatisfactory, and the brightness of the walls as viewed by the occupants is very great. Such lighting is unnatural and difficult to work with.

An object of the present invention is to redistribute this natural outdoor light by redirecting it in its passage through the brick wall so that the light is emitted from the inside of the building wall at higher angles, preferably at angles above the horizontal, whereby it is directed toward the ceiling of the room or toward the upper opposite wall of the room. In this manner the natural light is employed in a manner more acceptable to the eye. This redirection of light will give a bright ceiling with the brightness of the inner surface of the outer wall as viewed by an occupant of the room reduced sufficiently to make vision comfortable. The general effect will be that of indirect lighting with some direct component of light coming from the wall itself.

According to the present invention, the bricks may be made up in various shapes and provided with light redirecting means of suitable form. A preferred form of light directing means comprises prisms in one or both of the vertical face forming walls of the brick. These may be of a refracting or reflecting nature disposed interiorly or exteriorly of the brick. The light redirecting means may also be in the form of a reflecting medium in a horizontal or substantially horizontal surface as set forth in my application Serial No. 686,740, filed concurrently herewith and entitled "Reflecting brick and walls and buildings utilizing the same."

In the various forms of brick referred to, the natural light passes through vertical walls of the brick and somewhere in its path is refracted or reflected so as to be emitted at angles above the horizontal.

The accompanying drawings show, for purposes of illustrating the present invention, several embodiments in which the invention may take form, it being understood that the drawings are illustrative of the invention rather than limiting the same. In these drawings.

Figure 1:
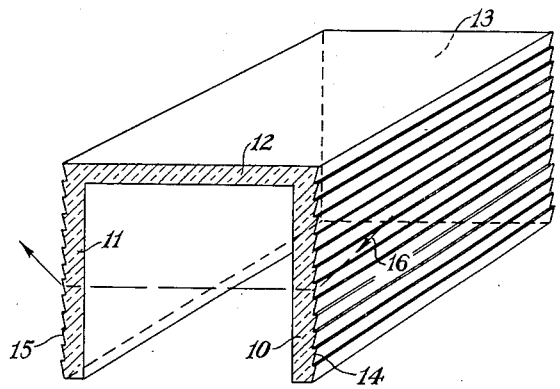
Fig. 1 is a perspective view of one form of translucent brick with parts in section in a transverse plane, showing a brick having external refracting prisms.

For simplicity in the drawings no showing is made of ledges, grooves, raised surfaces, or other formations on the tops and bottoms of the bricks to assist in securing cover plates or in laying the bricks in the wall.

In the form shown in Fig. 1, the brick is an inverted box-shaped pressed glass article formed to shape by a plunger and mold. One end of the brick is cut away to illustrate the cross section. This brick has side walls 10 and 11, a top wall 12, and end walls, only one of which is shown at 13. As the plunger must be withdrawn to form the hollow interior of the brick, it is obvious that longitudinally extending prisms cannot be formed on the inner face of the side walls. The prisms are shown at 14 and 15 on the outside of the side walls. The path of light is indicated by the line 16.

Figure 2:
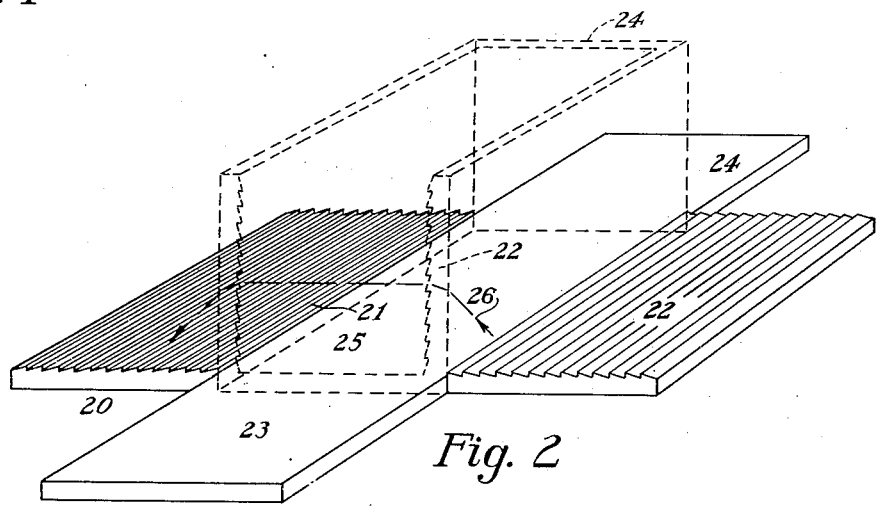
Fig. 2 is a perspective view showing in full lines a flat cruciform plate with prisms formed therein, and showing in dotted lines, a brick formed by folding the plate to box shape and fusing the edges, the brick appearing upside down in this figure.

Fig. 2 illustrates a method of obtaining horizontal prisms on the inside surfaces of the side walls of the brick. Here the brick is pressed in the form of a flat plate 20 shaped like a cross. It has prismatic portions 21 and 22 adapted to form the sides of the brick and plain portions 23 and 24 to form the ends of the brick. When these portions are folded and fused or otherwise fastened together, at the edges, one obtains a box-shaped brick as shown in dotted lines. For facility of illustration the brick is shown upside down. The portion of the brick which will be at the top when in the wall is shown at 25. The dotted line 26 indicates the path of light. The employment of interiorly disposed prisms eliminates the collection of dirt on exposed prisms.

Figure 3:
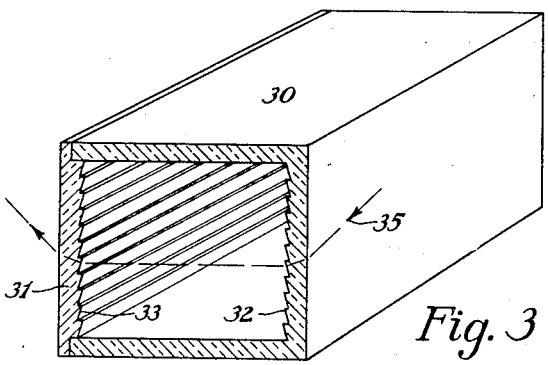
Fig. 3 is a view similar to Fig. 1 showing a laterally opening five-sided brick and cover both provided with refracting prisms.

Fig. 3 illustrates a brick 30 designed to be laid on its side. It is a side opening brick which may be readily pressed to shape and provided with a cover 31. The refracting prisms are shown at 32 and 33. The path of light is indicated by the line 35.

Figure 4:
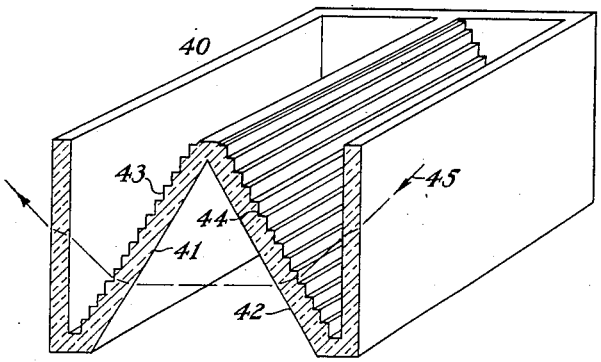
Fig. 4 is a similar view showing a refracting brick of W-shaped cross section.
Figure 4A:
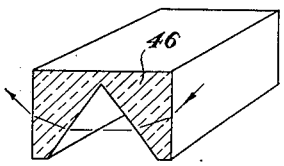
Fig. 4a illustrates a semi-solid refracting brick.

Fig. 4 shows a shape of brick 40 in which an interior V-shaped web 41, 42 is provided. This V-shaped web offers the opportunity for using horizontal prisms 43 and 44 to direct light upwardly. The web may be the full height of the brick, or it may be shallower. It may be pointed upward or downward, giving the bricks the form of a W or M in the cross-section. The path of light is indicated at 45. A further modification of this would consist in filling in the side spaces of the W or M to make a semi-solid brick with a V-shaped internal space as indicated at 46 in Fig. 4a. The ends of the bricks may be closed by end walls or may be left open. The mold would be an oblong in cross-section and the plunger would be a V.

Figure 5:
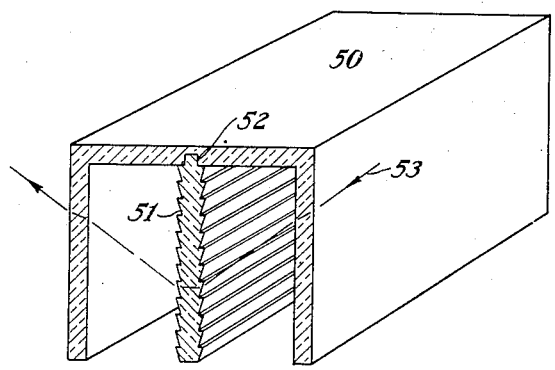
Fig. 5 is a similar view of a brick with a prismatic insert.

Fig. 5 shows another means of obtaining horizontal prisms by use of a brick 50 pressed in the customary way and an additional prismatic plate 51 designed to be fitted into the interior of the brick. This prismatic plate could be slipped into slots 52 provided in the brick proper and sealed in or held in by any means desired. The path of light is indicated at 53. This prismatic insert provides the horizontal prisms. It may be of various shapes, placed in any position in the brick, and it may contain various forms of prisms. One or more of these prismatic inserts may be placed in a brick with plain or prismatic side walls to increase the angles through which the light is elevated. This construction may be considered as covering broadly any form of prismatic piece set into the interior of the glass brick for the purpose of redirecting light.

Figure 6:
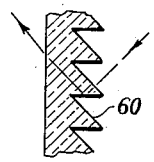
Figs. 6 and 7 are fragmentary views illustrating the use of interiorly disposed reflecting prisms.
Figure 7:
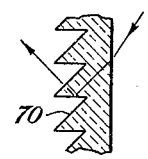

Figs. 6 and 7 illustrate the use of reflecting prisms 60 and 70 on the inner wall of bricks, which may be formed to shape, as indicated in Fig. 2, or made as in Figs. 1, 3, and 5.

Figure 8:
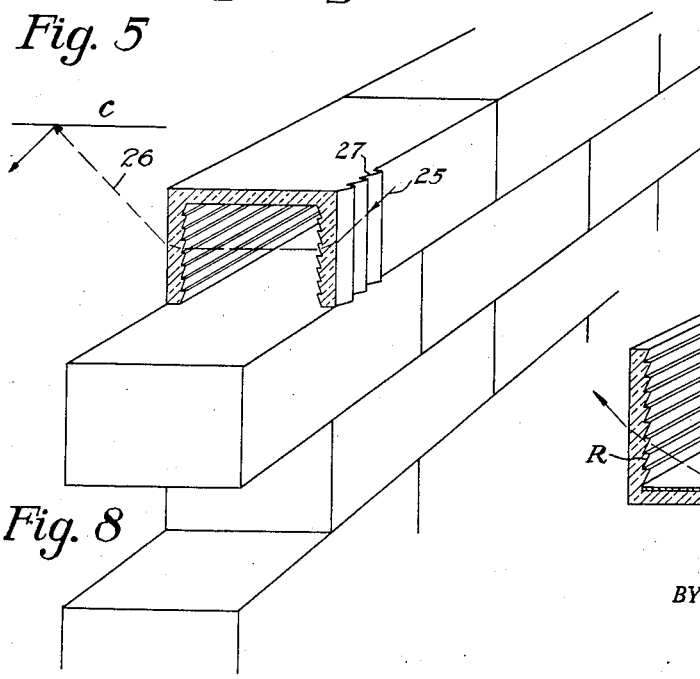
Fig. 8 illustrates a brick wall composed of bricks such as shown in Fig. 2 and illustrates the redistribution of the light by the ceiling.

A fragment of the wall is indicated in Fig. 8. It consists of a number of bricks such as shown (inverted) in Fig. 2, placed on top of one another in the usual manner. Natural light coming from the sky in downwardly oblique directions, as indicated at 25, enters an outer face of the brick wall, is refracted by the refracting medium carried by the brick, and sent into the room in upwardly oblique directions, as indicated at 26. This light is, therefore, directed toward the ceiling C of the room so as to be redistributed by the ceiling in a manner analogous to indirect lighting by artificial light. Owing to the upward direction of this light, the wall brightness (as viewed by an occupant of the room) is reduced to but a small amount of what it would be were the bricks of the ordinary type in which the light is transmitted with but slight diffusion and no redirection. This light control is not to be confused with prismatic window glass and the like designed to produce horizontally directed light rays which are adapted to extend down long interiors. Such window glass has extremely high brightness and the illumination is glaring and unnatural.

Where it is necessary to provide redirection laterally of the brick wall, some lateral diffusion may be had by employing vertical flutes, prisms, or other diffusing means on the vertical surfaces of the brick. Where the flutes or diffusing means are shallow, the lateral diffusion will be less pronounced, but where more intense lateral diffusion or redirection is desired, deeper prisms will be provided on the vertical surfaces. Such prisms are indicated at 27 in Fig. 8.

These prisms are shown on the outside of the wall in Fig. 8. Obviously such prisms or flutes could be used on any other vertical or oblique surface as for example the inner wall surfaces in Figs. 1, 4, 4a, and 5.

If the five-sided bricks are to be placed in the wall opening upwardly (instead of downwardly as shown in Fig. 8) the web connecting the walls will be at the bottom instead of the top of the brick, no change being made in the prism arrangement.

Figure 9:
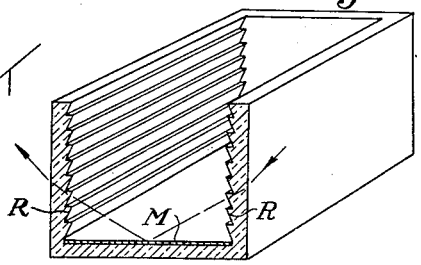
Fig. 9 illustrates a light directing brick having light refracting prisms in the vertical walls and a light reflecting medium in the horizontal wall.

Fig. 9 diagrammatically illustrates light control by bricks having refracting prisms R in the vertical walls and a reflecting medium M in the horizontal walls. The refracting prisms R may be any of the forms of refracting prisms shown in Figs. 1, 2, or 3 herein. The reflecting medium may be prismatic or may be obtained from a silvered surface applied to the glass itself on the horizontal glass surface, or by the use of aluminum paint, white paint, or any other form of reflecting coating applied on either the inner or the outer surface of the horizontal wall or by an insert.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. A brick for constructing light transmitting walls comprising a hollow, box-like light transmitting body, having vertical side and end walls and a transversely extending, substantially horizontal wall, refracting prisms in at least one side wall, said prisms being so constructed and so arranged on said side wall as to receive all the downwardly slanting light incident on one face of the brick and refract it so that the dominant light rays are emitted from the opposite face of the brick in an upwardly oblique direction.

2. A brick as claimed in claim 1, wherein the prisms are interiorly disposed.

3. A brick as claimed in claim 1, wherein the prisms are exteriorly disposed.

4. In a building, a wall composed of light transmitting box-like bricks, assembled in courses, each brick having vertical substantially transparent side walls to form the inner and outer faces of the building wall, vertical end walls interconnecting the side walls, and at least one transversely extending, substantially horizontal wall, each brick having longitudinally extending prismatic, light-directing means extending substantially uniformly over its entire length and height and so constructed and so arranged as to act on downwardly slanting sky light received on the outer face of the brick and elevate this light so that it is emitted from the inner face of the brick in upwardly slanting directions, and a ceiling disposed inwardly of the inner face of the wall to receive said upwardly slanting light and redistribute it downwardly for interior illumination.

5. A building as claimed in claim 4, wherein the light directing means includes prisms carried on a vertical wall of the brick.

6. A building as claimed in claim 4, wherein the light directing means is in the form of prisms carried on the inner surface of a vertical wall of the brick.

7. In a building, a wall composed of light-transmitting box-like bricks assembled in courses, each brick having vertical substantially transparent side walls to form the inner and outer faces of the building wall, vertical end walls interconnecting the side walls, and at least one transversely extending, substantially horizontal wall, each brick having longitudinal light-refracting prisms extending substantially uniformly over its entire length and height and so constructed and so arranged as to act on downwardly slanting sky light received on the outer face of the brick and elevate this light so that it is emitted from the inner face of the brick in upwardly slanting directions, and a ceiling disposed inwardly of the inner face of the wall to receive said upwardly slanting light and redistribute it downwardly for interior illumination.

8. A building as claimed in claim 7, wherein the prisms are carried by a vertical wall of the brick 9. A building as claimed in claim 7, wherein the prisms are interiorly disposed and carried by a vertical wall of the brick.

10. A building as claimed in claim 7, wherein the prisms are exteriorly disposed and carried by a vertical wall of the brick.

11. A building as claimed in claim 7, wherein the prisms are interiorly disposed and carried by both side walls.

12. In a building, a wall composed of light transmitting box-like bricks assembled in courses, each brick having vertical substantially transparent side walls to form the inner and outer faces of the building wall, vertical end walls interconnecting the side walls, and at least one transversely extending, substantially horizontal wall, each brick having longitudinal light refracting prisms placed on its light incident side wall and extending substantially uniformly over the entire length and height thereof and so constructed and so arranged as to intercept downwardly slanting sky light incident on the outer face of the brick and refract it into upwardly slanting directions for transmission in said upwardly slanting directions from the inner face of the brick, and a ceiling disposed inwardly of the inner face of the wall to receive said upwardly slanting light and redistribute it downwardly for interior illumination.

13. In a building, a wall composed of a plurality of substantially transparent bricks each of polygonal contour in vertical planes and having spaced side walls, to form an interior air space, each brick having interiorly disposed prismatic, light directing means extending longitudinally of this wall and disposed substantially uniformly over its entire center height and length and so constructed and so arranged as to act on downwardly slanting sky light received on the outer faces of the bricks and elevate this light so that it is emitted from the inner faces of the bricks in upwardly slanting directions, and a ceiling disposed inwardly of the inner face of the wall to receive said upwardly slanting light and redistribute it downwardly for interior illumination.

THOMAS W. ROLPH.